(12) United States Patent
Flynn

(10) Patent No.: US 6,450,129 B1
(45) Date of Patent: Sep. 17, 2002

(54) LEASH ASSEMBLY

(76) Inventor: Christopher J. Flynn, 1382 Nottingham, Grosse Pointe Park, MI (US) 48230

( * ) Notice: Subject to any disclaimer, the term of this patent is extended or adjusted under 35 U.S.C. 154(b) by 0 days.

(21) Appl. No.: 09/682,113

(22) Filed: Jul. 23, 2001

(51) Int. Cl.⁷ .............................................. A01K 27/00
(52) U.S. Cl. ..................................... 119/770; 119/792
(58) Field of Search ................................ 119/770, 792, 119/795; 182/3

(56) References Cited

U.S. PATENT DOCUMENTS

| | | | |
|---|---|---|---|
| 3,783,835 A | 1/1974 | Kepirq | |
| 4,167,156 A | 9/1979 | Kupperman et al. | |
| 4,892,063 A | 1/1990 | Garrigan | |
| 5,069,153 A | * 12/1991 | Pascher | 182/3 X |
| 5,441,017 A | 8/1995 | Lindsay | 119/795 |
| 5,649,504 A | 7/1997 | Culp | 119/795 |
| 5,701,848 A | 12/1997 | Tozawa | 119/797 |
| 5,718,189 A | 2/1998 | Blake | 119/770 |
| 5,718,192 A | 2/1998 | Sebastian | 119/795 |
| 5,727,500 A | 3/1998 | Conboy | 119/174 |
| 5,732,661 A | 3/1998 | Lagro | 119/796 |
| 5,738,046 A | 4/1998 | Williams et al. | 119/770 |
| 5,806,466 A | 9/1998 | Pintor et al. | 119/770 |
| 5,842,444 A | 12/1998 | Perrulli | 119/770 |
| 5,848,576 A | * 12/1998 | Colaianni | 119/770 |
| 5,852,988 A | 12/1998 | Gish | 119/795 |
| 5,950,569 A | 9/1999 | Perrulli | 119/770 |
| 6,019,067 A | 2/2000 | Carey | 119/795 |
| 6,053,128 A | 4/2000 | McCulloch | 119/792 |
| 6,053,129 A | 4/2000 | Akre | 119/795 |
| 6,073,590 A | 6/2000 | Polding | 119/795 |
| 6,085,695 A | 7/2000 | Miller et al. | 119/795 |
| 6,095,093 A | 8/2000 | Kisko et al. | 119/770 |

* cited by examiner

*Primary Examiner*—Robert P. Swiatek
(74) *Attorney, Agent, or Firm*—Gifford, Krass, Groh, Sprinkle, Anderson & Citkowski, P.C.

(57) ABSTRACT

A leash system having a generally rectangular pad dimensioned to fit around the buttocks of a person. A first strap is secured at one end to a first corner of the pad and this strap is dimensioned to extend across the front of the person and is detachably secured to a second corner of the pad. A second strap is secured at one end to a third corner of the pad and extends across the front of the person and is detachably secured to a fourth corner of the pad. Both straps extend through a ring while an elongated leash lead has one end secured to the ring and is detachably secured at its other end to an animal.

5 Claims, 2 Drawing Sheets

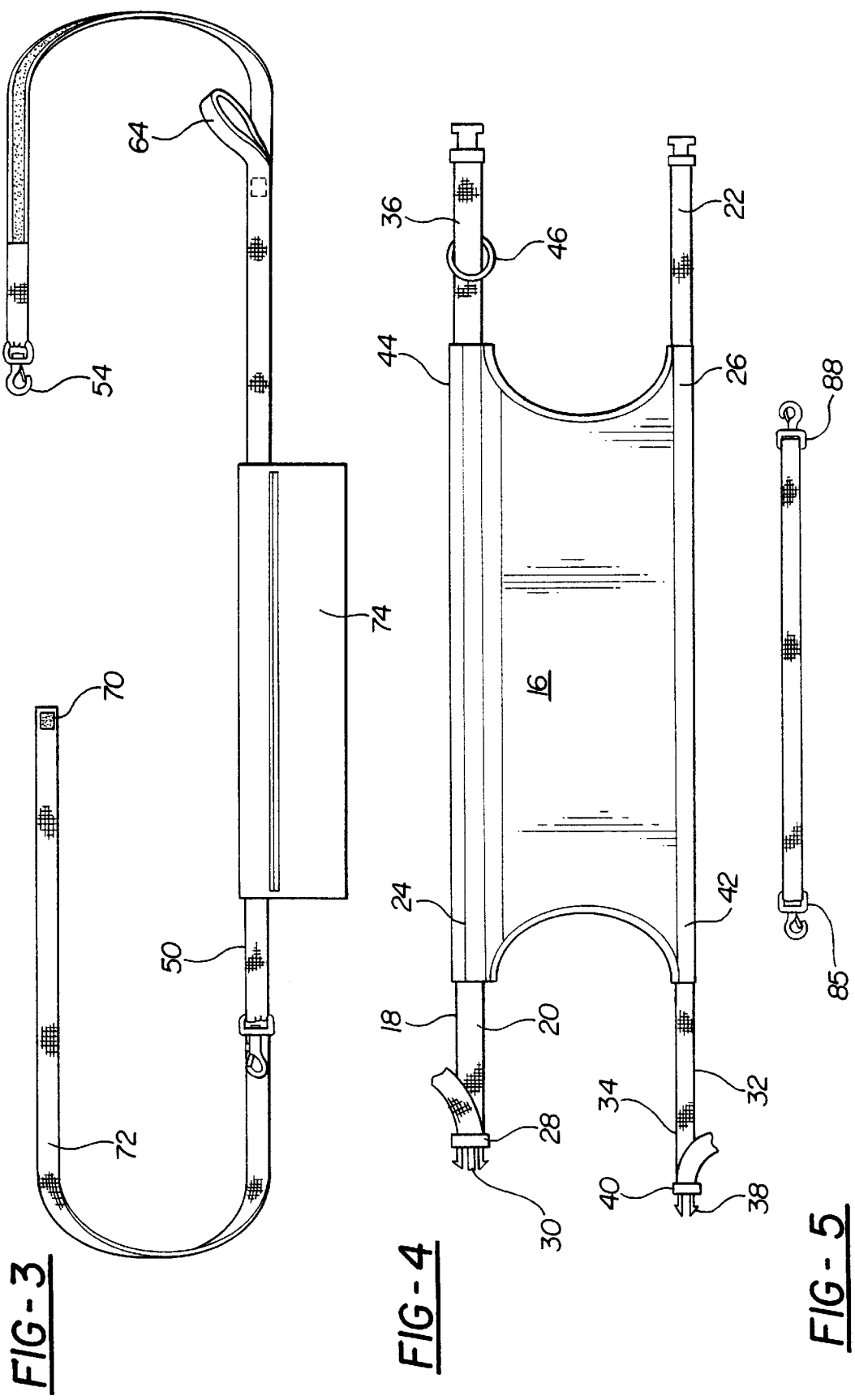

LEASH ASSEMBLY

BACKGROUND OF INVENTION

1. Field of the Invention

The present invention relates to an animal leash system.

2. Description of the Prior Art

A conventional dog leash typically consists of an elongated strap having one end detachably secured to the collar of an animal, such as a dog. A handle, e.g. a loop, is formed at the other end of the strap which is gripped by the animal handler.

While these previously known animal leashes are adequate for walking dogs or other animals, such leashes are cumbersome when one attempts to jog or run along with the animal. Rather, when jogging, it is highly desirable to have both hands free.

SUMMARY OF INVENTION

The present invention provides a dog leash system which is particularly useful for walking, jogging or running along with one or more animals.

In brief, the present invention comprises a generally rectangular pad dimensioned to fit around the buttocks of the animal handler. An elongated first strap is secured at one end to a first corner of the pad and is dimensioned to extend across the front of the user, through a ring, and is detachably secured to a second corner of the rectangular pad.

Similarly, a second elongated strap is secured at one end to a third corner of the pad and extends across the front of the user, through the ring, and is detachably secured to the fourth corner of the pad. The lengths of both the first and second straps, furthermore, are adjustable to accommodate animal handlers of different sizes.

An elongated leash lead then has one end secured to the ring and the other end secured to the animal, and typically to the animal's collar. If more than one animal is to be tethered, then the leash lead will have a ring instead of a connector 58 so leash extensions FIG. 5 can be used. The leash system of the present invention can be utilized with two or even more animals simultaneously.

A primary advantage of the leash system of the present invention is that the leash system frees the hands and arms of the animal handler to thereby permit the animal handler to jog along with the animals. Furthermore, since the pad is worn by the animal handler across the buttocks of the animal handler, the animal handler is able to restrain the animal(s) in the event the animal(s) attempt to run faster than the jogger without fear of falling or other injury in response to a sudden tug from the animal(s).

BRIEF DESCRIPTION OF DRAWINGS

A better understanding of the present invention will be had upon reference to the following detailed description, when read in conjunction with the accompanying drawing, wherein like reference characters refer to like parts throughout the several views, and in which:

FIG. 3 is a plan view illustrating a portion of the preferred embodiment of the present invention;

FIG. 4 is a plan view illustrating a still further portion of the preferred embodiment of the present invention; and FIG. 5 is a plan view illustrating a component of the present invention.

DETAILED DESCRIPTION

Figure 1:
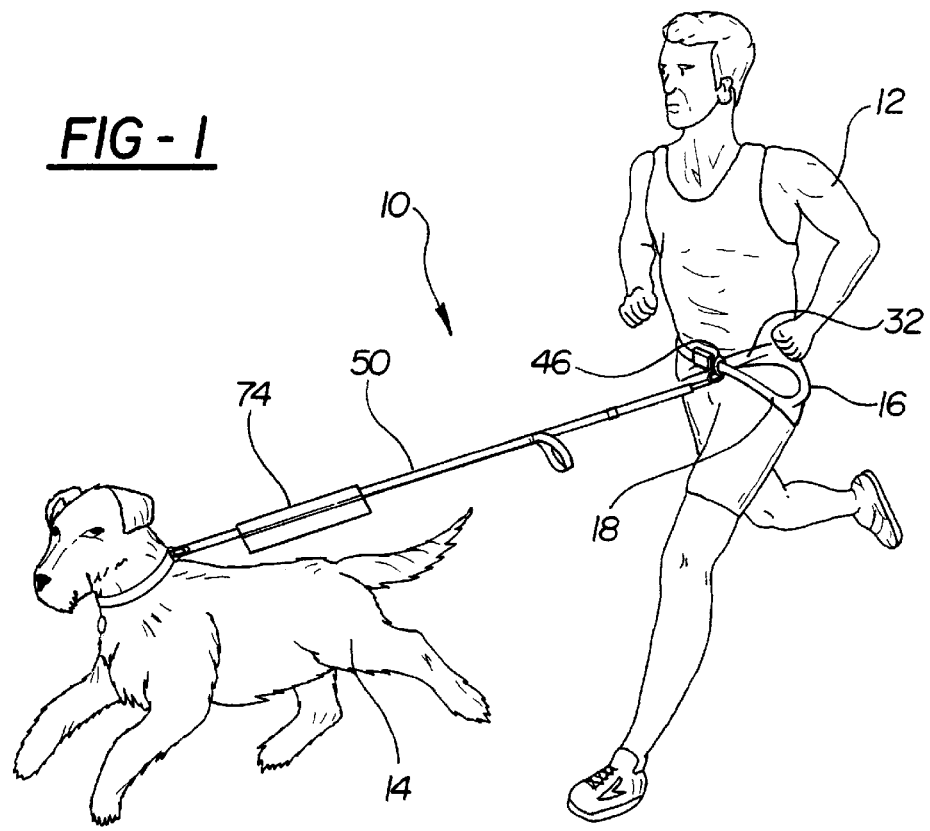
FIG. 1 is a perspective view illustrating a preferred embodiment of the present invention.

With reference first to FIG. 1, a preferred embodiment of the leash system 10 of the present invention is there shown in use by an animal handler 12 for use with an animal 14, such as a dog. Although only a single animal 14 is shown tethered by the leash system 10, as will be hereinafter described in greater detail, the leash assembly 10 of the present invention can be used for two or even more animals.

Figure 2:
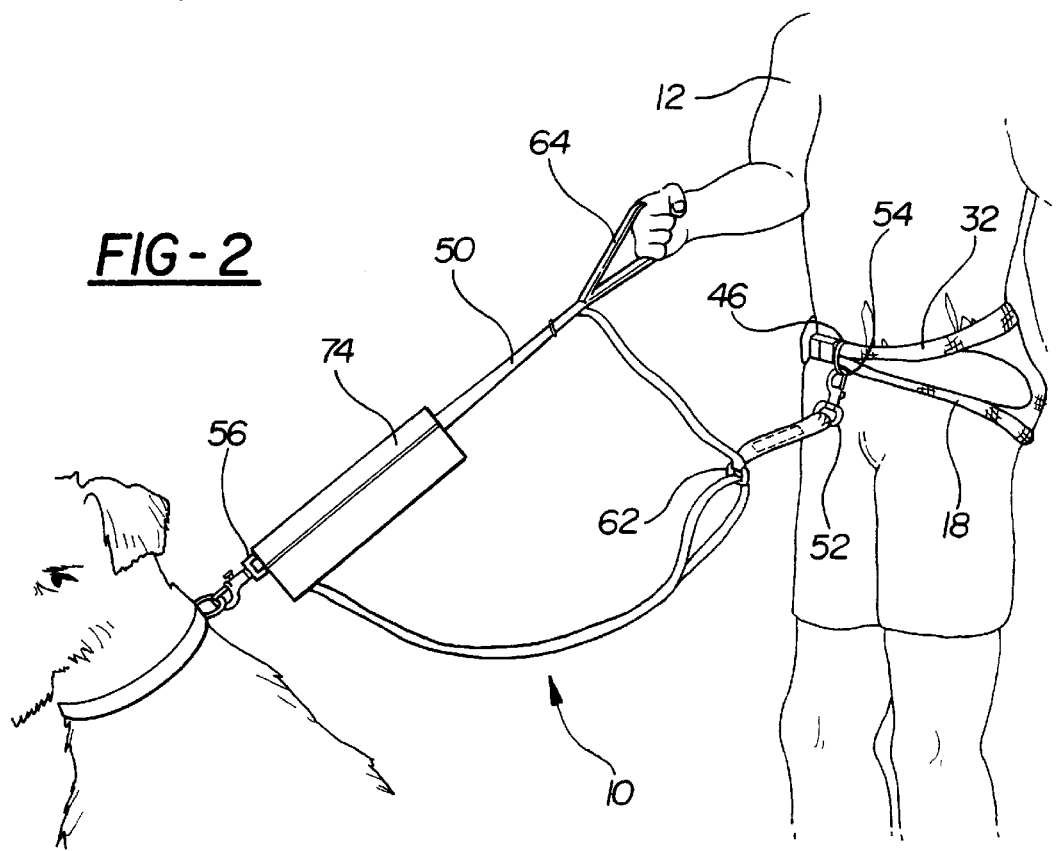
FIG. 2 is a view similar to FIG. 1 and illustrating the preferred embodiment of the present invention.

With reference now generally to FIGS. 2 and 4, the leash system 10 comprises a generally rectangular pad 16 which is dimensioned to fit around the buttocks of the animal handler 12. A first elongated strap 18 having a first part 20 and a second part 22 is dimensioned to extend between two corners 24 and 26 of the pad 16 and across the front of the user. Any conventional means 28 can be used to adjust the overall length of the first strap 18 in order to accommodate different sized animal handlers 12. Additionally, the parts 20 and 22 of the first strap 18 are detachably secured together by any conventional connector 30.

Similarly, a second elongated strap 32 having a first part 34 and a second part 36 extends across the front of the animal handler 12 between the other two corners 42 and 44 of the pad 16. The second strap 32, like the first strap 18, includes any conventional means 40 to adjust the length of the second strap 32 to accommodate different sized animal handlers 12. Similarly, any conventional connector 38 is used to detachably secure the strap parts 34 and 36 together to form the elongated strap 32.

Referring now particularly to FIGS. 1 and 2, both straps 18 and 32 extend through a ring 46 so that the straps 18 and 32 form a cruciform shape across the front of the animal handler 12. In doing so, the pad 16 is securely attached across the handler's buttocks since the diagonal force exerted by the straps 18 and 32 shape the pad 16 around the buttocks and minimize slippage of the pad 16. The ring 46 is preferably constructed of metal although, alternatively, other materials may alternatively be used.

Even though the first strap 18 preferably extends diagonally across the pad 16 and, likewise, the second strap 32 extends diagonally between the corners 42 and 44 of the pad 16, alternatively the first strap 18 may extend between the corners 24 and 44 of the pad while the second strap 32 extends between the corners 42 and 26 of the pad 16. In either case, however, the straps 18 and 32 extend through the ring 46 and thus form a cruciform shape across the front of the animal handler 12 thereby firmly, but detachably, securing the pad 16 across the buttocks of the user as previously described.

With reference now to FIGS. 2 and 3, the leash system 10 further comprises leash lead 50 having one end 52 detachably secured by a connector 54 (FIG. 2) to the ring 46. The opposite end 56 of the leash lead 50 is detachably connected by a connector to the animal 14 and typically to an animal collar.

As best shown in FIG. 2, the leash lead 50 may include a buckle 62 which enables the overall length of the leash lead 50 to be adjusted. Additionally, a loop or handle 64 is preferably secured to a midpoint of the leash lead 50 to facilitate handling of the animal 14 by hand when desired.

In order to facilitate the adjustment of the overall length of the leash lead 50, the leash lead 50 preferably includes a loop or pile fastener 70 at one end of the leash lead 50 which is detachably secured to the other of the loop and pile fastener 72 mounted along the length of the leash lead 50. Thus, by looping the end 70 of the leash through the buckle 62 and adjustably securing the fastener 70 to different portions of the fastener 72 along the leash lead 50 as shown in FIG. 2, the effective overall length of the leash lead 50 may be easily and rapidly adjusted.

Preferably, a dog waste container 74 is optionally detachably secured to the leash lead 50. The container 74 is particularly useful for areas which require pet owners to remove any animal waste from their animals.

Although only a single leash lead 50 is illustrated in FIG. 1, it will be understood that the leash system 10 of the present invention may be used for multiple animals by simply using a leash lead 50 that has a ring rather than a connector. With the ring then the leash extensions in FIG. 5 can be used with connector 85.

As best shown in FIG. 1, since the leash lead 50 is attached to the pad 16 mounted to the buttocks of the animal handler 12, the animal handler 12 is able to easily walk, jog or run along with the animal 14 while maintaining his or her hands free. Furthermore, since the pad 16 is secured around the buttocks of the user 12, and thus at a relatively low center of gravity of the animal handler 12, accidents or possible injury to the animal handler 12 caused by the animal 14 outrunning or tugging the animal handler 12 is minimized.

From the foregoing, it can be seen that the present invention provides a simple and yet highly effective leash system which enables, among other things, the animal handler to jog with the animal while maintaining his or her hands free. Having described my invention, however, many modifications thereto will become apparent to those skilled in the art to which it pertains without deviation from the spirit of the invention as defined by the scope of the appended claims.

I claim:

1. A leash system for a person comprising:

a generally rectangular pad dimensioned to fit around the buttocks of the person, a first strap secured at one end to a first corner of the pad, said first strap being dimensioned to extend across the front of the person and detachably secured to a second corner of the pad, a second strap secured at one end to a third corner of the pad, said second strap being dimensioned to extend across the front of the person and detachably secured to a fourth corner of the pad, a ring, said first and second straps extending through said ring, an elongated leash having one end secured to said ring and detachably secured to an animal at its other end.

2. The invention as defined in claim 1 and comprising means for adjusting the length of said leash.

3. The invention as defined in claim 2 wherein said adjusting means comprises a hook and pile fastener between an end of said leash and an intermediate portion of said leash.

4. The invention as defined in claim 1 and comprising a handgrip secured to said leash.

5. The invention as defined in claim 1 and comprising a waste container detachably secured to said leash.

* * * * *